United States Patent [19]
Arii et al.

[11] Patent Number: 5,091,986
[45] Date of Patent: Feb. 25, 1992

[54] OPTICAL DIVIDER FOR MULTIMODE OPTICAL FIBER SYSTEMS

[75] Inventors: Mitsuzo Arii; Norio Takeda; Shigeo Kataoka; Osamu Kondoh; Kuniaki Jinnai; Hisashi Ohwada; Tomoko Kondoh, all of Tokyo, Japan

[73] Assignee: Mitsubishi Gas Chemical Co., Ltd., Tokyo, Japan

[21] Appl. No.: 610,680

[22] Filed: Nov. 8, 1990

[30] Foreign Application Priority Data

Nov. 15, 1989 [JP] Japan .................................. 1-294908

[51] Int. Cl.$^5$ .............................................. G02B 6/26
[52] U.S. Cl. ...................................... 385/48; 385/49
[58] Field of Search ............... 350/96.11, 96.12, 96.15, 350/96.16

[56] References Cited

U.S. PATENT DOCUMENTS

| | | | |
|---|---|---|---|
| 4,089,583 | 5/1978 | Auracher et al. | 350/96.15 |
| 4,184,739 | 1/1980 | d'Auria et al. | 350/96.15 |
| 4,360,248 | 11/1982 | Bickel et al. | 350/96.16 |
| 4,693,544 | 9/1987 | Yamasaki et al. | 350/96.15 |

FOREIGN PATENT DOCUMENTS

| | | |
|---|---|---|
| 56-3522 | 1/1981 | Japan . |
| 62-69205 | 3/1987 | Japan . |
| 62-183405 | 8/1987 | Japan . |

OTHER PUBLICATIONS

Optical fibre Coupling to High-Silica Channel Waveguides with Fibre-Guiding Grooves, Electronics Letters, Apr. 12, 1984, vol. 20, No. 8, p. 313, Y. Yamada et al.

Planar gradient-index glass waveguide and its applications to a 4-port branched circuits an star coupler, APPLIED OPTICS, Jun. 1, 1984, vol. 23, No. 11, p. 1745, Eiji Okude et al.

Polymeroptical circuits for multimode optical fiber systems, APPLIED OPTICS, Sep. 15, 1980, vol. 19, No. 18, p. 3124, Takashi Kurokawa et al.

*Primary Examiner*—Frank Gonzalez
*Attorney, Agent, or Firm*—Sughrue, Mion, Zinn, Macpeak & Seas

[57] ABSTRACT

An optical divider for multimode optical fibers of graded-index (GI) type composed of an optical input section for securing input optical fiber, a branching section including an optical waveguide having rectangular sectional shapes irrespective of a kind of material or a method of fabricating the same and consists of a main optical waveguide and branch waveguide, and an optical output section for securing an array of output optical fibers, wherein the main optical waveguide having a width D and a length M is divided contiguously into N branch optical waveguides, preferably three or more having uniform width W, the optical waveguide having substantially uniform core thickness T is specifically related with the core diameter K of the otpical fiber to fufull the following relational formulas:

$$0.7 \leq T/K \leq 0.85 \quad (1)$$

$$0.35 \leq W/K \leq 0.80 \quad (2)$$

$$15 \leq M/D \leq 70 \quad (3)$$

$$D = N \times W \quad (4)$$

for reducing a coupling loss between the optical fibers and the optical waveguide and improved a loss variance by selecting the value of M/D to the value within the range as specified above or more preferably within a range of $20 \leq M/D \leq 60$.

6 Claims, 4 Drawing Sheets

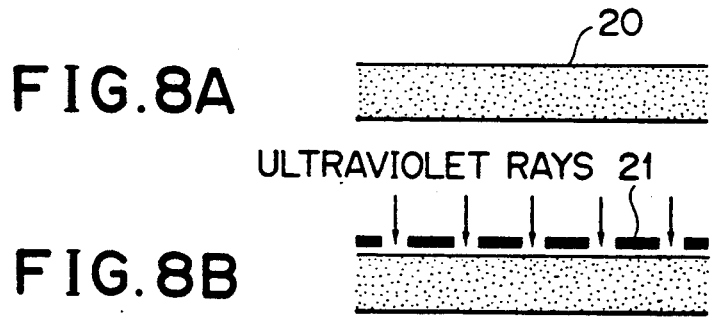
FIG. 8A
FIG. 8B
FIG. 8C
FIG. 8D
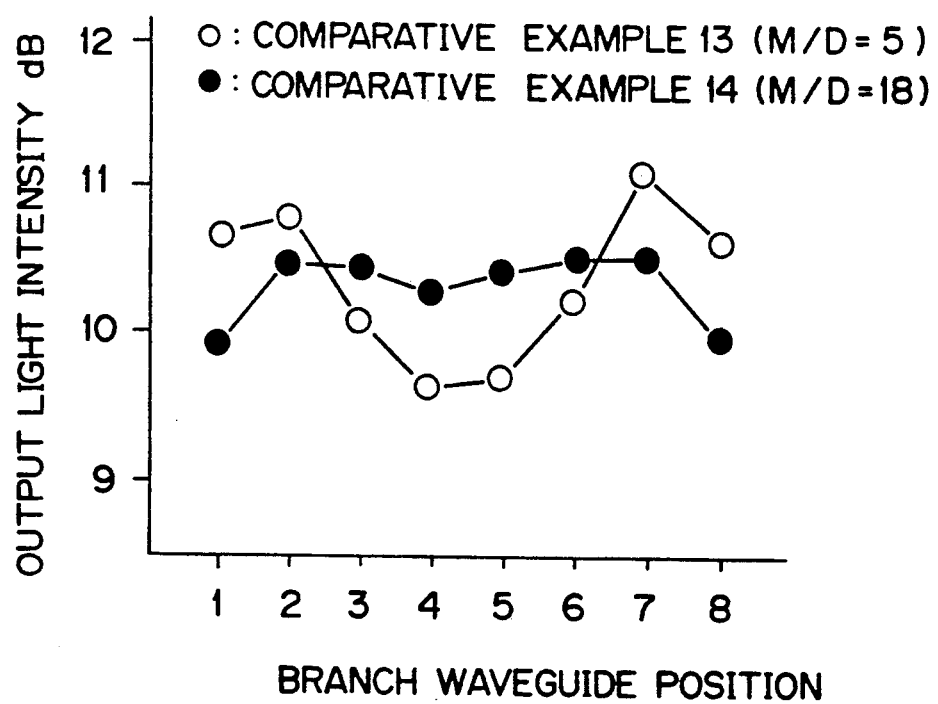
FIG. 9

OPTICAL DIVIDER FOR MULTIMODE OPTICAL FIBER SYSTEMS

BACKGROUND OF THE INVENTION

1. Field of the Invention

This invention relates to an optical device in optical communication systems, more particularly, to a waveguide type optical divider for multimode optical fibers with graded refractive-index, which is used for optical communications, optical measurements and so forth.

2. Description of the Prior Art

An optical divider is an important device for dividing an input light signal into a plurality of optical signals or systems in the field of optical communications or optical measurements. As for the optical divider, there are several types of optical dividers such as a half mirror, a fused and extended optical fiber, a plane waveguide (hereinafter referred to briefly as waveguide), made of such a material as a polymer, glass and the like. Since a waveguide type optical divider has properties such that it is highly flexible in designing, easy to fabricate multi-branch circuits and so forth, various investigations about such optical dividers have been executed in the past. Particularly, multimode optical fibers of graded-index type (hereinafter referred to briefly as "GI") are widely used in optical communication systems for a comparatively short distance such as in a local optical network, and it has been longed for providing an optical divider in good quality for the GI type optical fibers.

Principal indices for the properties of such optical dividers are optical loss and loss variance. It is known that a cross sectional shape of an optical waveguide can be formed substantially into a circle as in a glass waveguide provided by an ion migration method, however, in most cases, optical waveguides are of rectangular cross sections. When an optical fiber having circular sectional shape is connected to an optical waveguide having a rectangular cross section to provide an optical divider, the coupling loss due to a mismatching in shape (hereinafter referred to as shape loss) may occur, and the shape loss contributes greatly to the optical loss of the optical divider. Thus, in order to improve performance of an optical divider, it is important to reduce such shape loss.

On the other hand, for improving the loss variance of the multimode optical divider, there has been proposed a method in which a width of a branched optical waveguide at a central portion is made comparatively narrow relative to that of an end portion because of a fact that the intensity distribution of transmitting light in a main optical waveguide is strong at the middle (center) portion but weak at the end (peripheral) portion as described in Japanese Patent Laid-open No. 62-69205. However, in that publication, a method of designing a branching optical waveguide and the effect thereof are not disclosed.

It is therefore an object of the present invention to provide an optical divider having a low optical loss and an improved loss variance for use with optical fibers of GI type.

Firstly, a cause of occurring a shape loss, which is the main factor of the optical loss, will be described. Jointing conditions (jointing section) between optical fibers and wave guides are normally such that as shown in FIG. 1A (schematic cross sectional view at input side) and FIG. 1B (schematic cross sectional view at output side). Generally, a core width D of a main optical waveguide at the input side is greater than a core diameter K of an optical fiber. Accordingly, the optical loss in a direction of width when a light from an input optical fiber 7 enters a main optical waveguide 2 can be reduced theoretically to zero. However, as to a direction of thickness, the optical loss at portions indicated by hatching cannot be eliminated depending on a core thickness T of the optical waveguide. Theoretically, such optical loss in the direction of thickness can be reduced to zero by making the core thickness T of the optical waveguide core greater than the core diameter K of the optical fiber (T>k), however, this results in the optical loss at the output side.

Accordingly, in order to fabricate an optical divider with low optical loss, the core thickness T of the optical waveguide must be selected and designed to be an optimum value, at first, for reducing the shape loss.

Secondly, at the output side, if a core width W of a branched optical waveguide is smaller than a dimension which is inscribed in a circle having the core diameter K of the optical fiber, an output light from the branched optical waveguide 3 will enter an optical fiber 7 and there will be no shape loss. However, if the core thickness T of the waveguide is set to a value which is very proximate to the core diameter K of the optical fiber (dotted lines in FIG. 1B), then the optical loss at the input side may be reduced, but if the width W of the branch optical waveguide is designed excessively small with respect to the core thickness T of the optical waveguide, there will be some difficulties in forming an optical circuit as well as fabricating the optical circuit.

In order to reduce the shape loss of an optical divider, optimization of the core thickness T of the optical waveguide and the width W of the branch optical waveguide with respect to the core diameter K of the optical fiber should be achieved at first, but this is not easy, heretofore, because the optimization has been carried out by way of trial and error as well as experiences.

If there is a difference in refractive-index between a central portion and a peripheral portion of the optical waveguide, a power at the terminal end of the optical waveguide may vary in accordance with a value of the refractive-index. In particular, the light being transmitted through a sufficiently long optical waveguide in a stationary mode has high intensity at the central portion but low at the peripheral portion of the output end of the optical waveguide and cannot be branched uniformly. However, after the inventors have studied for an improvement of the optical divider for use with the optical fibers, it has been found that the power distribution at the terminal end of the branched optical waveguide varies depending upon a shape, a length and a width of the main optical waveguide, and the optical divider having an improved loss variance can be fabricated by optimizing those conditions.

It is therefore an object of the present invention to provide an improvement in an optical divider for use with a multimode optical fiber of GI type which is low in optical loss and superior in loss variance.

SUMMARY OF THE INVENTION

As a result of an earnest study of the optical divider for multimode optical fibers of GI type which have a low optical loss and an improved loss variance, the inventors have succeeded in obtaining circuit structure of an optical divider and in expressing a relationship between the circuit structure and the core diameter of the optical fiber with relational formulas, and the present invention has been completed.

An optical divider, which is an objective of the present invention, consists of, as shown in FIG. 2 (schematic perspective view), an optical input section 11 in which an input optical fiber is disposed, a branching section 12 for distributing (branching) an input light signal to a plurality, three or more, of systems, and an optical output section 13 in which output optical fibers for extracting branched lights are disposed. A single input optical fiber 7 is properly mounted and secured to a predetermined portion of a substrate 8 of the optical input section 11. Further, the substrate 8 additionally has a function of reinforcing the jointing (coupling) strength between the input optical fiber 7 and the branching section 12. In the branching section 12, an optical waveguide 1 for distributing (branching) the input light to a plurality, three or more, of systems is properly mounted and secured to a predetermined portion of a substrate 9.

In the optical output section 13, a plurality of output optical fibers 7 for taking out branched lights are properly aligned and secured to predetermined portions of a substrate 10. The substrate 10 additionally has a function of reinforcing the jointing (coupling) strength between the output optical fibers 7 and the branching section 12.

The core thickness T of the optical waveguide 1 is substantially uniform. Meanwhile, the optical waveguide 1 is designed to have a circuit structure such that a single main optical waveguide 2 is divided (branched) contiguously into N branch optical waveguides 3, greater than 3 in number (FIG. 3). That is, the main optical waveguide 2 is designed to be a liner optical waveguide having a width D and a length M while the branch optical waveguides 3 are designed to have a structure such that the width W of each branch waveguide 3 may be substantially uniform entirely from a branching portion 4 of the main optical waveguide 2 to a jointing portion 6 to the output optical fibers 7.

When the present invention is embodied, dimensions of the optical waveguide of the branching section and the optical fibers must fulfill the following relational formulas:

$$0.7 \leq T/K \leq 0.85 \quad (1)$$

$$0.35 \leq W/K \leq 0.80 \quad (2)$$

$$15 \leq M/D \leq 70 \quad (3)$$

$$D = N \times W \quad (4)$$

where, T represents a core thickness of the optical waveguide, K is a core diameter of the optical fibers, W is a width of a branch optical waveguide, M is a length of a main optical waveguide, D is a width of the main optical waveguide, and N is a branch number ($N \geq 3$) of the branch optical waveguide.

By designing dimensions of various portions of the optical waveguides and optical fibers to fulfill the relational formulas given above, coupling loss between the optical fibers and the optical waveguide can be reduced significantly, and an optical divider which is of low in optical loss and superior in loss variance can be fabricated very readily and, further, in industrially large scale and with high productivity. It is to be noted that the relational formula (1) and the relational formula (2) are formulas representing the relationship between the size of the optical waveguide and the optical fiber and the shape loss, and through which formulas, allowable ranges for the core thickness T of the optical waveguide and the width W of the branch optical waveguides with respect to the optical fibers can be determined.

Further, the inventors have made detailed examinations for a method of improving the optical loss and loss variance, and have found that an excess loss and the loss variance have a close relation with the core thickness T of the optical waveguide 1 and the width W of the branch optical waveguide 3 and, in turn, have obtained such results of FIGS. 4 and 5 (also refer to FIG. 1). Here, the excess loss is a function of an intensity Io of input light and a sum $\Sigma$ In of values of intensity of branched and distributed N rays of output light and signifies the following formula:

$$\text{Excess loss } (dB) = 10 \cdot \log (Io/\Sigma In)$$

where, the loss variance denotes a difference between the maximum value and the minimum value when values of intensity of the output light rays from the N branch optical waveguides are expressed in dB.

Further, the relational formula (3) given above is an expression representing a relationship between the optical waveguide dimensions and the loss variance of the optical divider, and through which formula, dimensions of the main optical waveguide or allowable ranges of designing the width D and the length M with respect to the optical fiber can be obtained. The inventors have made detailed examinations for a method of improving the loss variance and have found out that the loss variance has a close relation with the width D and the length W of the main optical waveguide 2 and, in turn, have obtained such results of FIGS. 6 and 7 (also refer to FIG. 2).

The relations of FIGS. 6 and 7 are established within a range of practical use irrespective of the branching number N and the width W of the branch optical waveguides, and by selecting the value of M/D to a value within a range of:

$$15 \leq M/D \leq 70$$

or more preferably within a range of:

$$20 \leq M/D \leq 60$$

an optical divider which is superior in loss variance can be fabricated readily and effectively.

Meanwhile, the relational formula (4) given above is an expression representing a relationship among the branching number N, the width W of the branch optical waveguides and the width D of the main optical waveguide. In order to design an optical divider of low optical loss, the width D of the main optical waveguide should be designed to have such dimension as being equal to or greater than the core diameter K of an optical fiber to be jointed ($K \leq D = N \times W$).

If selection of the width D of the main optical waveguide and/or the width W of the branch optical waveguides is not appropriate, then the mismatching in shape between the optical fiber and the main optical waveguide and/or between the branch optical waveguides and the optical fibers may take place to increase coupling loss. Further, if each width W of the branch optical waveguides is selected to a value extremely smaller than each core diameter K of the optical fibers, then the width D of the main optical waveguide will become extremely smaller than the core diameter K of the optical fibers, thus the optical loss due to a shape loss in the direction of width will take place at the input side.

As described above, the present invention can be applied to all of multimode type optical dividers which employ the optical waveguides having rectangular sectional shapes irrespective of a kind of material of the optical waveguides or of a method of fabricating the same.

As a method of fabricating the optical waveguide of the present invention, particularly, a method of fabricating a polymer optical waveguide by the selective photopolymerization of a light reactive monomer within a polymer matrix disclosed in Japanese Patent Publication No. 56-3522, a method of fabricating a glass waveguide by doping a metal salt into porous glass disclosed in Japanese Patent Application No. 1-78301 and so forth may be listed as examples.

The present invention resides in obtaining a high performance optical divider suitable for use with optical fibers of GI type. While the optical waveguide of the prior art has been designed by way of trial and error as well as based on experiences, it is possible to achieve an optimum design readily in accordance with the present invention and, further, it is possible to fabricate and provide an optical divider of high quality and high performance with high productivity.

BRIEF DESCRIPTION OF DRAWINGS

FIGS. 8A through 8D are diagrams showing steps of fabricating a polymer optical waveguide used in the present invention; and FIG. 9 is a diagram showing a light intensity for each of optical output ports of an optical divider having different port widths.

DETAILED DESCRIPTION OF THE INVENTION

In the following, preferred embodiments of the present invention are described, and effects of the same will also be described more concretely and in detail.

It is to be noted that the examples which are described in the following are only for illustrating the present invention and are not intended as to restrict the scope of the present invention.

EXAMPLES 1 to 3

1. Designing of a Photomask

Figure 1A:
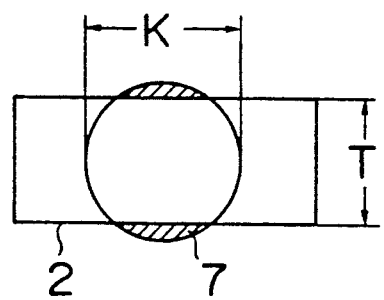
FIGS. 1A and 1B are schematic diagrams for illustrating an occurrence of shape loss due to mismatching of shapes between an optical fiber and an optical waveguide.
Figure 1B:
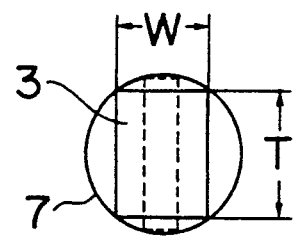
Figure 2:
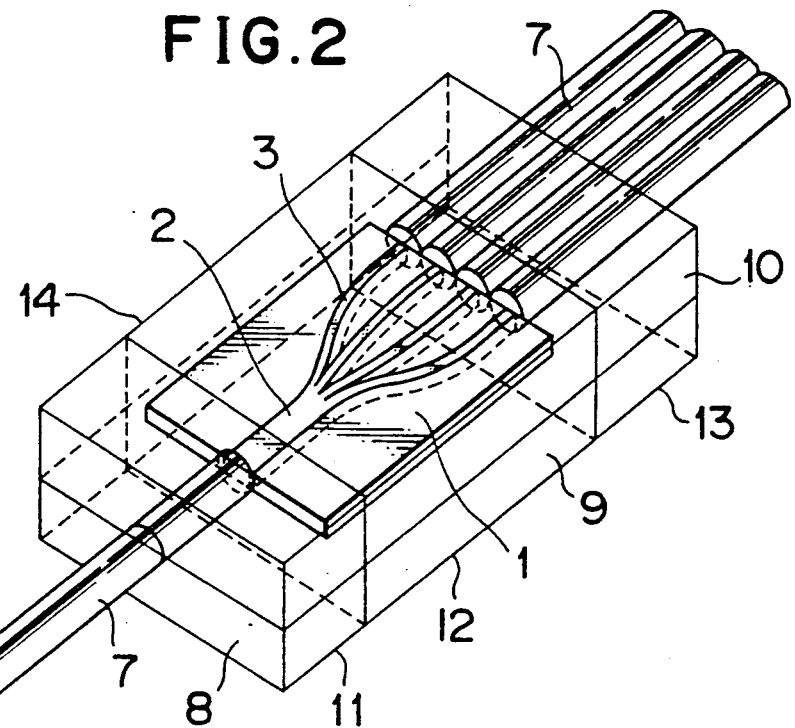
FIG. 2 is a perspective view showing an optical divider of the present invention.
Figure 3:
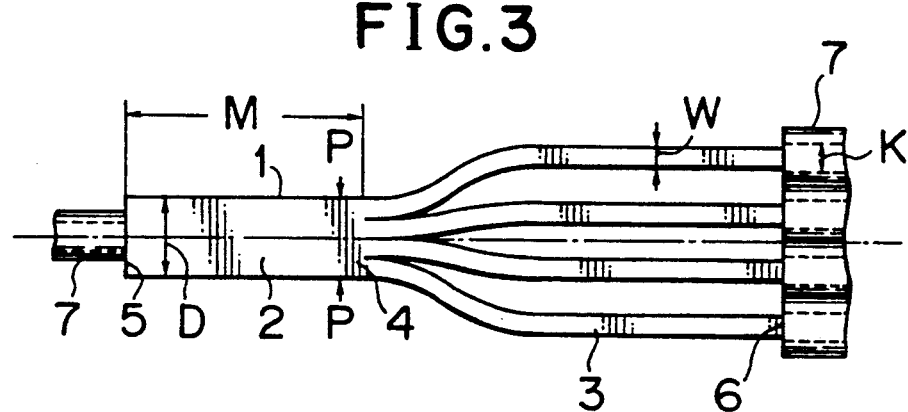
FIG. 3 is a schematic plan view showing an optical circuit pattern of the present invention.

A quartz photomask for a 4-port divider for a GI optical fiber having a core diameter K of 50 μm was produced, which quartz photomask has a circuit structure wherein the overall length is 30 mm, the branch optical waveguide width W is 25 μm (W/K=0.5), the width D of the main optical waveguide is 100 μm (24×4 μm) and the length M of the main optical waveguide is 100 mm (refer to FIG. 3).

2. Fabrication of an Optical Waveguide

FIG. 8 is a schematic diagram showing a process of fabricating a polymer optical waveguide employed in the present invention. A polycarbonate film 20, which contains methyl acrylate as a light reactive monomer and benzoin ethyl ether as a photopolymerization starting agent, was produced (refer to FIG. 8A). The film obtained here was then covered with the quartz photomask 21 produced at the step 1 described above, and exposed to ultraviolet rays in accordance with a conventional method for photopolymerizing the methyl acrylate monomer at exposed portions 22 (refer to FIG. 8B).

Subsequently, the methyl acrylate monomer at non-exposed portions 23 was removed by vacuum desiccation in accordance with a conventional method (refer to FIG. 8C) to obtain a polymer film wherein the non-exposed portions 23 have a single phase of polycarbonate (which constitutes a core of high refractive-index) while the exposed portions 22 have a mixed phase of polycarbonate and polymethyl acrylate (which constitutes a clad of low refractive-index).

Phases 24 of low refractive-index, which is lower in value than that of the non-exposed portions 23, were formed in accordance with a conventional method on upper and lower surfaces of the polymer film obtained (refer to FIG. 8D) to form clad layers 24 in a vertical direction for providing optical waveguides of table 1.

TABLE 1

| | Waveguide Core Thickness T μm | T/K |
|---|---|---|
| Example 1 | 35 | 0.70 |
| Example 2 | 40 | 0.80 |
| Example 3 | 43 | 0.85 |

3. Assembling of an Optical Divider

Fabrication of Branching Sections

After the film being provided with the optical waveguide has secured to a substrate by means of a bonding agent, the opposite sides thereof were cut and polished until they become optically flat to provide a branching section 12 wherein the length M of the main optical waveguide is 5 mm (M/D=50) and the overall length is 25 mm. As a substrate to be used for the reinforcement of such optical waveguide, it is preferable to use a substrate having such a structure as it has a through-hole in which a waveguide is disposed and secured as disclosed, for example, in Japanese Patent Application No. 63-85154. By employing such substrate, an optical divider which is firm and superior in performance can be provided.

Fabrication of an Optical Input Section and an Optical Output Section

A single optical fiber element was disposed at a predetermined position of a substantially mid-portion of a substrate and secured thereto by means of a bonding agent in accordance with a conventional method to fabricate an optical input section 11. Further, four optical fiber elements were similarly disposed on a substrate such that adjoining optical fiber elements were held in contact with each other and secured to the substrate by means of a bonding agent to fabricate an optical output section 13.

Connection

On an optically fine adjusting table, the optical input section 11 and the optical output section 13 were disposed at the opposite sides of the branching section 12, and a light with a wavelength of 0.85 μm was introduced from the optical input section 11 and positional adjustment was performed for achieving an optimum condition. The positional adjustment was performed in such a manner as to make the sum of output intensity of light rays from the optical output section 13 minimum and all that the output intensity of the light rays from the four branches equal to each other. Hence, a bonding agent was applied between the optical input section 11 and the branching section 12 and that between the optical output section 13 and the branching section 12 to provide an optical divider 14.

4. Measurement

Figure 4:
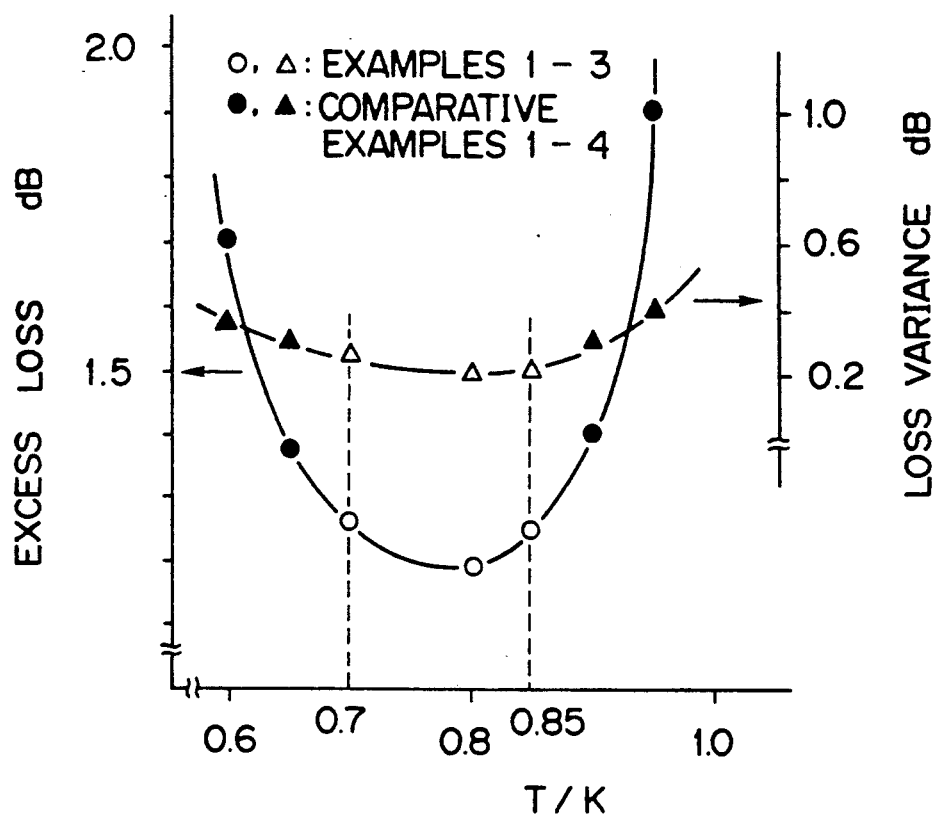
FIG. 4 is a diagram showing a relation of an excess loss and loss variance with a core thickness of an optical waveguide.

By utilizing an LED light source (Type AQ-1304) by Ando Denki Kabushiki Kaisha and an optical power meter (Type AQ-1111) by Ando Denki Kabushiki Kaisha, measurements of output intensity of the light rays derived from various optical dividers in test were carried out in accordance with a conventional method, and results of FIG. 4 (○, △) are obtained.

EXAMPLES 4 to 7

1. Designing of a Photomask

A quartz photomask for a 4-port divider for the GI optical fiber which has the core diameter K of 50 μm was produced. The quartz photomask has a circuit structure wherein the overall length is 30 mm, the length M of the main optical waveguide is 10 mm, the width W of each branch optical waveguide and the width D of the main optical waveguide are such as listed in Table 2.

TABLE 2

|  | Branch Waveguide Width W μm | Main Waveguide Width D μm | W/K |
| --- | --- | --- | --- |
| Example 4 | 17 | 72 | 0.35 |
| Example 5 | 25 | 100 | 0.50 |
| Example 6 | 30 | 120 | 0.60 |
| Example 7 | 40 | 160 | 0.80 |

2. Fabrication of an Optical Waveguide

Polymer optical waveguides were fabricated in a similar manner to the Example 1. The core thickness T of the optical waveguides was made 40 μm in all. Accordingly, a ratio T/K of the core thickness T of the optical waveguides to the core diameter K of the optical fibers was 0.8 in all.

3. Assembling of an Optical Divider

The main optical waveguide was cut so that a ratio M/D of a length M to a width D of the main optical waveguide became 50 in all for providing an optical divider in a similar manner to the Example 1.

4. Measurement

Figure 5:
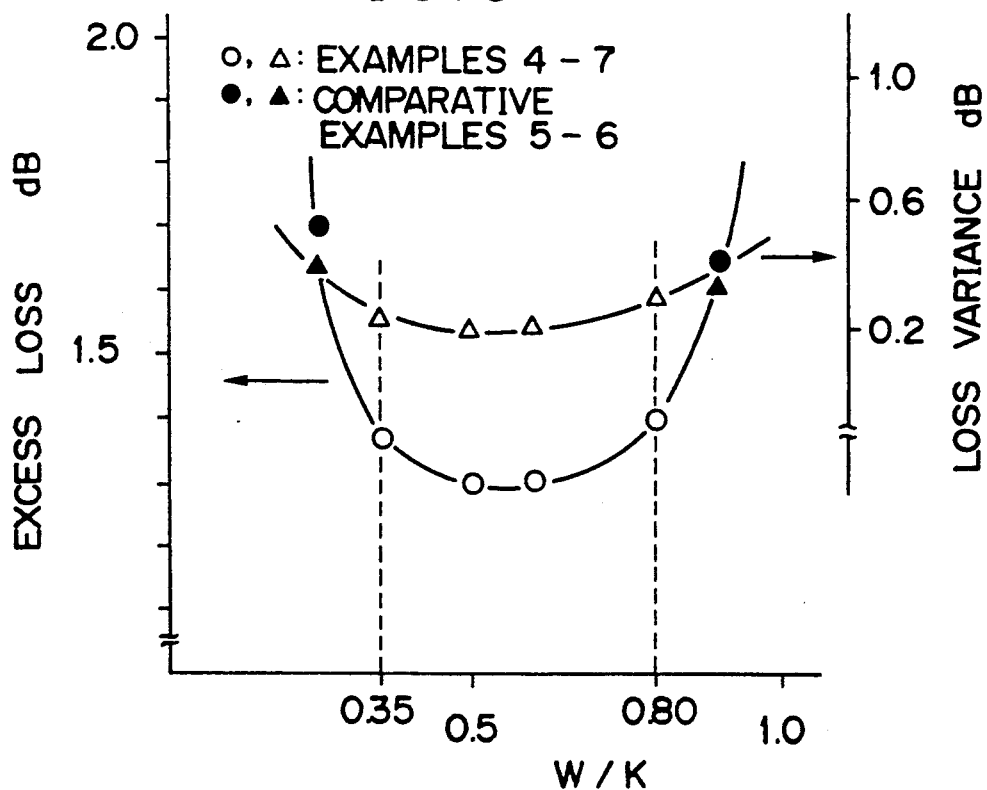
FIG. 5 is a diagram showing a relation of the excess loss and loss variance with a width of a branch optical waveguide.

Measurement was performed in a similar manner to the Example 1 and results of FIG. 5 (○, △) were obtained.

EXAMPLES 8 to 12

1. Designing of a Photomask

The quartz photomask used for the Example 5 was used.

2. Fabrication of an Optical Waveguide

A polymer waveguide having the core thickness T of 40 μm (T/K=0.8) was produced in a similar manner to the Example 1.

3. Assembling of an Optical Divider

The main optical waveguide was cut so that the length M of which may have such values as indicated in Table 3 to provide an optical divider in a similar manner to the Example 1.

TABLE 3

|  | Branch Number | Main Waveguide Length M mm | M/D |
| --- | --- | --- | --- |
| Example 8 | 4 | 1.5 | 15 |
| Example 9 | 4 | 2.8 | 28 |
| Example 10 | 4 | 3.5 | 35 |
| Example 11 | 4 | 6.0 | 60 |
| Example 12 | 4 | 7.0 | 70 |

4. Measurement

Figure 6:
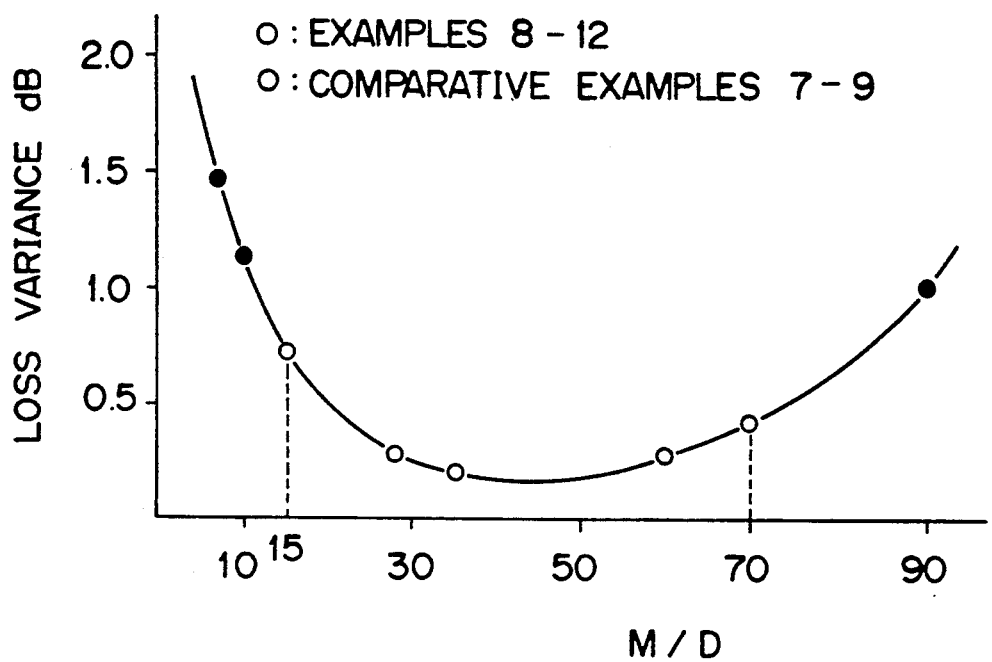
FIG. 6 is a diagram showing a relation of the loss variance with a ratio of a length to a width of a main optical waveguide for a 4-port optical divider.

Measurement was performed in a similar manner to the Example 1, and results of open circle ○ mark of FIG. 6 were obtained.

EXAMPLES 13 to 17

1. Designing of a Photomask

A quartz photomask for a 6-port divider for the GI optical fiber having the core diameter K of 50 μm was produced. The quartz photomask has a circuit structure wherein the overall length is 40 mm, the width W of the branch optical waveguides is 40 μm, the width D of the main optical waveguide is 240 μm and the length M of the main optical waveguide is 22 mm.

2. Fabrication of an optical Waveguide

A polymer optical waveguide was produced in a similar manner to the Example 1. The core thickness T of the optical waveguide is 40 μm in similar to the Example 8.

3. Assembling of an Optical Divider

The main optical waveguide was cut so that the length M of the main optical waveguide may take such values as indicated in Table 4 to provide an optical divider in a similar manner to the Example 1.

TABLE 4

|  | Branch Number | Main Waveguide Length M mm | M/D |
| --- | --- | --- | --- |
| Example 13 | 6 | 3.6 | 15 |
| Example 14 | 6 | 6.0 | 25 |
| Example 15 | 6 | 8.4 | 35 |
| Example 16 | 6 | 12.0 | 50 |
| Example 17 | 6 | 16.8 | 70 |

4. Measurement

Figure 7:
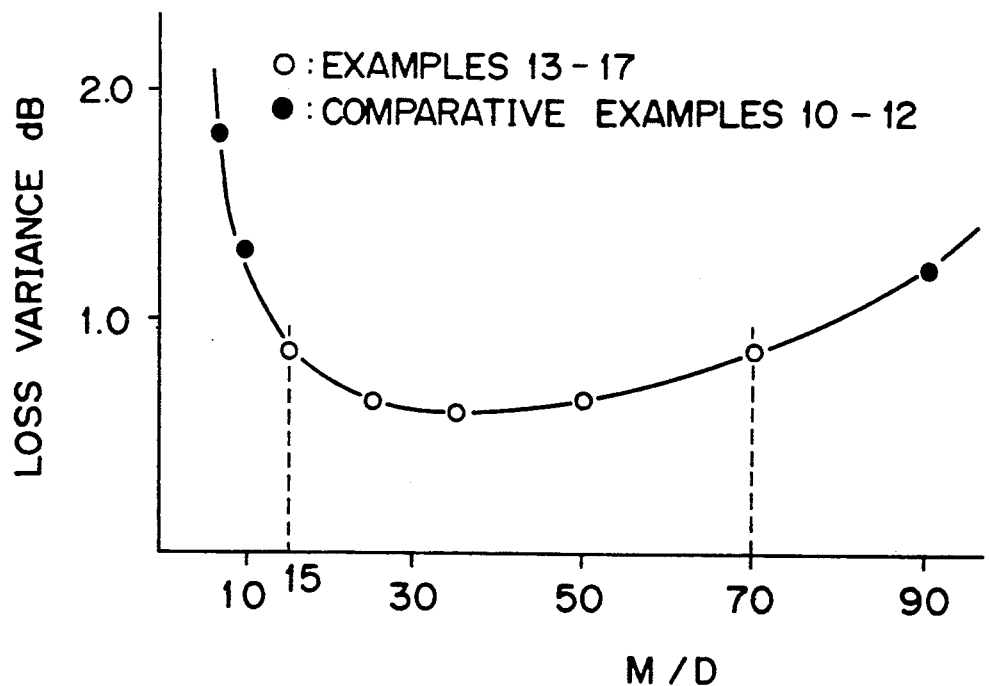
FIG. 7 is a diagram showing a relation of the loss variance with a ratio of a length to a width of a main optical waveguide for a 6-port optical divider.

Measurement was performed in a similar manner to the Example 1, and results of open circle ○ mark of FIG. 7 were obtained.

COMPARATIVE EXAMPLES 1 to 4

Utilizing the quartz photomask of the Example 1, four different 4-port optical dividers were produced, wherein the core thickness T of the optical waveguides are 30 μm (T/K=0.6), 33 μm (T/K=0.65), 45 μm (T/K=0.9) and 48 μm (T/K=0.95), and thereby the measurement was carried out in a similar manner to the Example 1. Consequently, results of FIG. 4 ( , ) were obtained.

COMPARATIVE EXAMPLES 5 to 6

The quartz photomasks for 4-port optical dividers for the GI optical fiber having the core diameter K of 50 μm were produced. The quartz photomasks have the overall length of 300 mm in all while have the width W of 13 μm (T/K=0.25) and 45 μm (T/K=0.9) for branch optical waveguides. The measurement was performed in a similar manner to the Example 1. Consequently, results of FIG. 5 ( , ) were obtained. It is to be noted that the core thickness T of the optical waveguide was all 40 μm.

Meanwhile, the ratio M/D of the length M to the width D of the main optical waveguide was all 50 similarly to the Examples 4 to 7.

COMPARATIVE EXAMPLES 7 to 9

Optical waveguides were produced in accordance with the method of the example 1 by utilizing the quartz photomask of the Example 5, and optical dividers having the main optical waveguides of different length M of 0.7 mm (M/D=7), 1 mm (M/D=10) and 9 mm (M/D=90) were produced. Then, measurement was carried out, and results of solid circle mark of FIG. 6 were obtained.

COMPARATIVE EXAMPLES 10 to 12

Optical waveguides were produced by utilizing the quarts photomask used in the Example 13, and optical dividers having the main optical waveguides of different length M of 1.7 mm (M/D=7), 2.4 mm (M/D=10) and 21.6 mm (M/D=90) were produced. Then, measurement was performed, and results of solid circle mark of FIG. 7 were obtained.

COMPARATIVE EXAMPLES 13 to 14

As an 8-port optical divider for the GI optical fiber having the core diameter of 50 μm, optical waveguides were produced in a similar manner to the Example 1 by utilizing a quartz photomask, which photomask has the overall length of 30 mm and the width W of 29 μm for two outermost ones of eight branch optical waveguides on the output side while the width W of 25 μm for six inner side branch optical waveguides (the width D of the main optical waveguide is 208 μm and the length M of the main optical waveguide is 10 mm).

Subsequently, optical dividers having different length M of 1.0 mm (M/D=5) and 3.7 mm (M/D=18) for main optical waveguides were produced, and output intensity of light rays from the branch optical waveguides were measured. Consequently, results of FIG. 9 were obtained.

According to the present invention, an optical divider which is low in optical loss and superior in loss variance and is most suitable for a core diameter of an optical fiber to be used in optical communication apparatuses, optical measuring instruments and so forth can be designed readily by anyone without requiring experiences and skillfulness, and then an optical divider of high quality and high performance can be provided with high productivity.

Although the present invention has been described in detail with reference to the presently-preferred embodiments, it should be understood by those of ordinary skilled in the art that various modifications can be made without departing from the spirit and scope of the invention. Accordingly, the invention is not to be limited except as by the appended claims.

What is claimed is:

1. An optical divider comprising:
   an optical input section in which an input optical fiber is disposed;
   a branching section including an optical divider, which consists of a main optical waveguide coupled to a plurality of branch optical waveguides, for dividing input light into a plurality of optical signals;
   and an optical output section in which output optical fibers are disposed for distributing said plurality of optical signals;
   whereby said optical waveguide and said optical fibers are formed to satisfy the following relations:

$$0.7 \leq T/K \leq 0.85 \quad (1)$$

$$0.35 \leq W/K \leq 0.80 \quad (2)$$

$$15 \leq M/D \leq 70 \quad (3)$$

$$D = N \times W \quad (4)$$

where, T is a core thickness of said optical waveguide, K is a core diameter of said input and output optical fibers, W is a width of said branch optical waveguide, M is a length of said main optical waveguide, D is a width of said main optical waveguide, and N is a number of branches of said branch optical waveguides.

2. An optical divider as defined in claim 1, wherein said number of branches N of branch optical waveguides is three or more.

3. An optical divider as defined in claim 1, wherein said input and output optical fibers are of graded-index multimode type.

4. An optical divider as defined in claim 1, wherein said input optical fiber, said optical waveguide, and said output optical fibers are disposed and secured to a substrate with use of a bonding agent.

5. An optical divider as defined in claim 1, wherein said optical waveguide is formed within a polymer film.

6. An optical divider as defined in claim 1, wherein said M/D is selected to be $20 \leq M/D \leq 60$.

* * * * *